United States Patent [19]

Oprandi et al.

[11] 4,006,295
[45] Feb. 1, 1977

[54] METHOD OF DETECTING DEFECTS IN SIGNALS CORRESPONDING TO THE READ-OUT OF A DATA CARRIER AND SYSTEM FOR IMPLEMENTING SUCH A METHOD

[75] Inventors: Pierre Oprandi; René Romeas, both of Paris, France

[73] Assignee: Thomson-Brandt, Paris, France

[22] Filed: July 21, 1975

[21] Appl. No.: 597,633

[30] Foreign Application Priority Data

July 23, 1974 France .................. 74.25492

[52] U.S. Cl. .................. 358/127; 360/38
[51] Int. Cl.² .................. H04N 5/76
[58] Field of Search .................. 360/38, 51, 27; 178/6.6 DC, 69.5 R, 69.5 TV, 69.5 DC, 6.7 A, 6.6 DD; 179/100.3 V, 100.1 R

[56] References Cited
UNITED STATES PATENTS

| | | | |
|---|---|---|---|
| 3,071,723 | 1/1963 | Gabor | 360/38 |
| 3,080,487 | 3/1963 | Mellott et al. | 360/38 |
| 3,474,418 | 10/1969 | Jensen | 360/38 |
| 3,865,981 | 2/1975 | Welch et al. | 360/38 |
| 3,909,518 | 9/1975 | Baker | 360/38 |
| 3,912,858 | 10/1975 | Kenney | 178/6.6 DC |
| 3,925,605 | 12/1975 | Rennick | 178/6.6 DC |
| 3,925,811 | 12/1975 | Kenney | 178/6.6 DC |
| 3,947,873 | 3/1976 | Buchan | 360/38 |

*Primary Examiner*—Raymond F. Cardillo, Jr.
*Attorney, Agent, or Firm*—Cushman, Darby & Cushman

[57] ABSTRACT

The present invention relates to a method of detecting defects in the signal furnished by the head used to read-out information recorded upon a data carrier. The read-out signal is converted by two voltage comparators whose thresholds are respectively lower and higher than the mean peak amplitude of the carrier signal in two squarewave signals which, applied to an assembly of monostable switching circuits associated with logic gates, are responsible for the production of a defect signal capable of controlling a defect correcting circuit, which is fed with the read-out signal.

5 Claims, 3 Drawing Figures

METHOD OF DETECTING DEFECTS IN SIGNALS CORRESPONDING TO THE READ-OUT OF A DATA CARRIER AND SYSTEM FOR IMPLEMENTING SUCH A METHOD

The present invention relates to method and apparatus for detecting defects in signals produced by the read-out head in a system designed to reproduce coded information using several carrier or sub-carrier waves each transmitting one or more pieces of information (video information, chrominance information etc...). Such a method makes it possible, by means of a defect signal produced in response to the detection of the defects to control a correcting system whose purpose is to remedy the detected defects.

With the type of coding defined hereinbefore, it is necessary at the time of read-out to separate the different carriers or sub-carriers waves using appropriate filters. Defects (drop-outs, parasitic signals, various disturbances) can affect each of the carrier waves variously in accordance with their relative amplitudes, their individual frequencies and the cause of the defects. It is therefore sometimes necessary to detect these defects or incorrect signals separately in respect of each of the carrier frequencies, that is to say after filtering.

The present invention relates to a method of and a device for effecting rapid detection of incorrect signals, which makes it possible, using appropriate elements, to effect compensation. The speed of response achieved is one of the major advantages of the invention.

In accordance with a further object of the invention there is provided a system for implementing the above mentioned method.

For a better understanding of the present invention, and to show how the same may be carried into effect, reference will be made to the ensuing description and the attached figures among which:

Throughout the figures, similar elements are given similar references.

Figure 1:
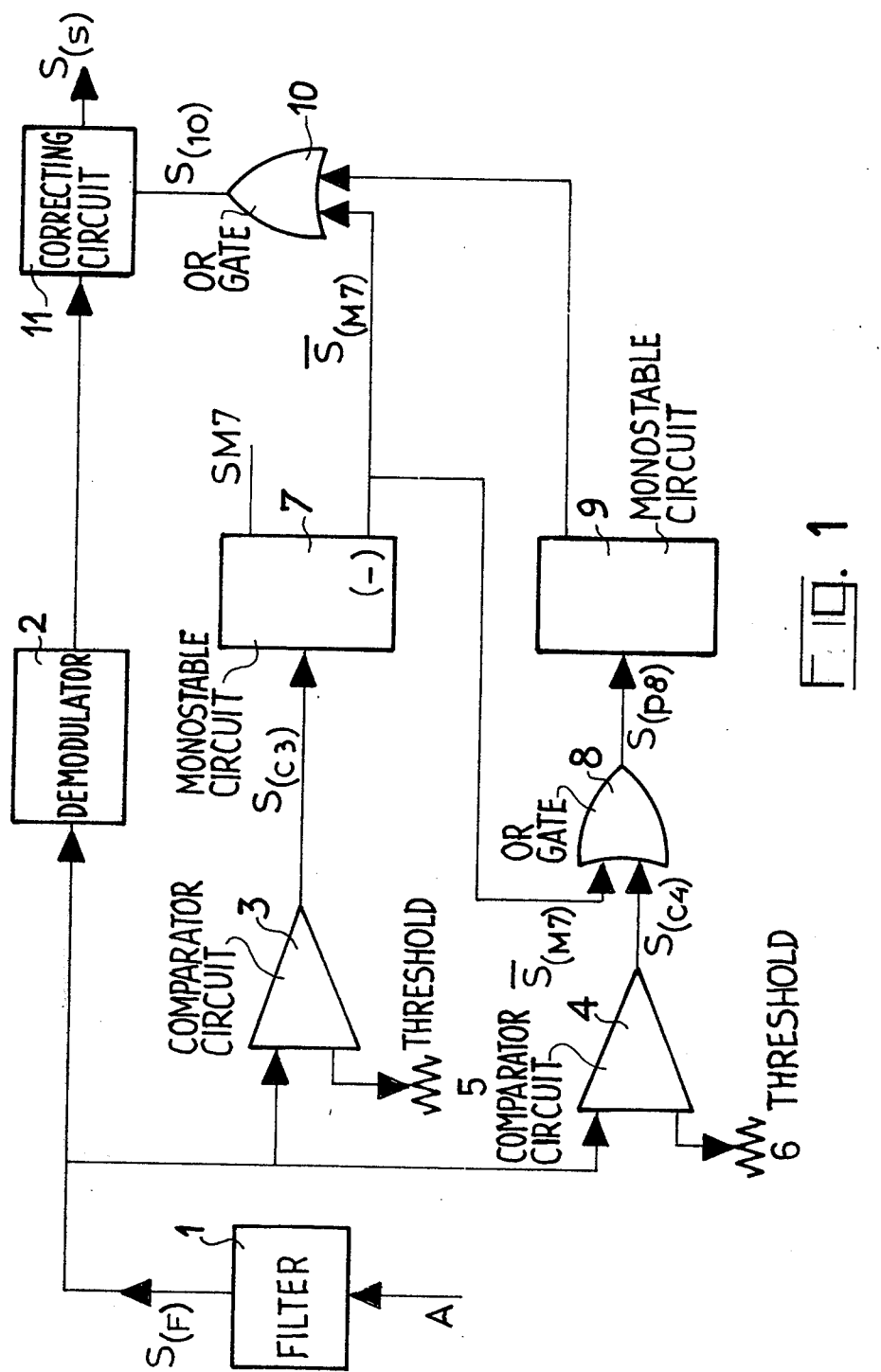
FIG. 1 is a schematic illustration of an embodiment of a system capable of implementing a method of detecting defects, in accordance with the invention.

FIG. 1 schematically illustrates a system capable of implementing a method of detecting defects for controlling a defect correction circuit.

Said system essentially comprises a filter 1 to the input of which the read-out signal A coming from a read-out head, not shown in the figure, is applied.

The output signal S(F) from the filter 1 is applied to the demodulator 2. Signal S(F) is processed by two voltage comparators 3 and 4 whose thresholds 5 and 6 are respectively adjusted so that the comparator 3 has a reference voltage lower than the mean peak voltage of the carrier signal, and the comparator 4 a reference voltage slightly higher than the mean peak amplitude of the carrier signal. The filtered carrier signal S(F) as well as the values of the two thresholds $C_3$ and $C_4$ assigned to each of said two comparators 3 and 4, have been shown in FIG. 2. The filtered carrier signal S(F) can be split into a certain number of intervals. The signal is normal during the intervals ($a_1, a_2, a_3$). On the other hand, the interval $b$ corresponds to a loss of signal (drop-out) and the interval $c$ to a burst of oscillations. Certain defects in the carrier signal are in other words translated into terms of losses in signal level of variable duration, which can be likened to an instantaneous frequency lower than the lowest frequency of the frequency range wherein reading is effected on the data carrier; this is what happens during the interval $b$. Other defects in the carrier signal result in the appearance, due to the transient response of the filter, of bursts of overshoot oscillations having a higher amplitude than the mean amplitude of the carrier signal; this, in other words, is what happens during the interval $c$.

Figure 2:
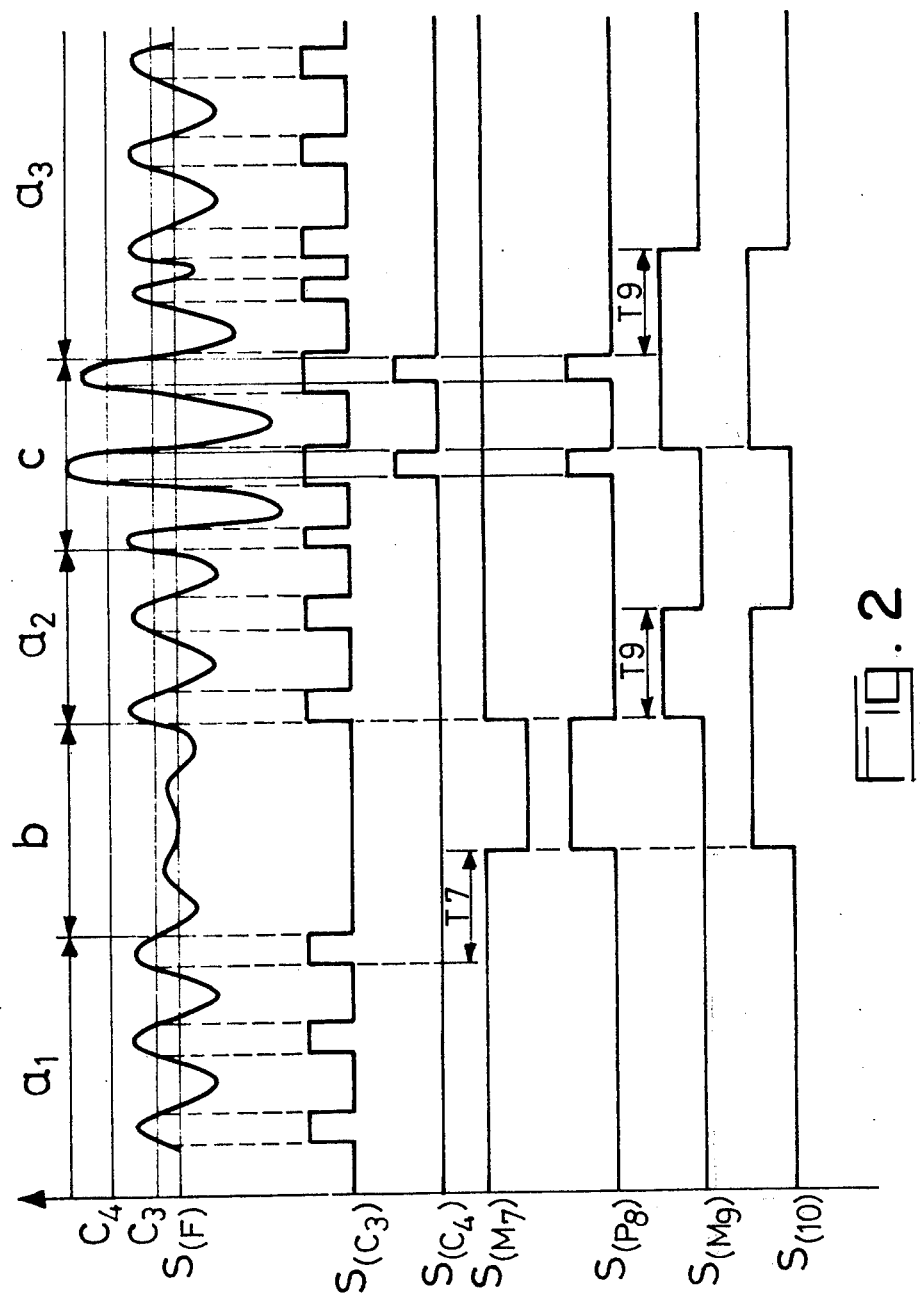
FIG. 2 illustrates the diagrams of the output and input signals common to the principal elements which constitute the system shown in FIG. 1.

The form of the signal $S(c_3)$ at the output of the comparator $C_3$ and that of the signal $S(c_4)$ at the output of the comparator $C_4$, have been shown in FIG. 2.

It is only during the interval C corresponding to the aforedefined burst of oscillations, that pulses appear at the output of the comparator 4.

The output signal $S(c)$ is applied to the input of a monostable switching circuit which can acquire two states: the state 1 known as the "off" state and the metastable "on" state 2 which last only for a predetermined duration. The transfer from state 1 to state 2 is controlled by a trigger pulse applied to the input of the device. At the end of the duration thus defined, the system automatically reverts to the state 1 unless fresh trigger pulses have appeared in the interim. This device may, as described hereinafter, be a monostable trigger stage 7, whose relaxation time is $TM_7$.

In accordance with an important feature of the invention, the time $TM_7$ is selected slightly longer than the longest period occuring in the signal recorded upon the data carrier. In the absence of disturbances, the monostable trigger stage 7 receives holding (maintaining) pulses. In the presence of a disturbance which can be likened to an instantaneously lower frequency (interval $b$) than the lowest frequency recorded on the data carrier, the monostable trigger stage 7 receives no further trigger pulse before the end of its relaxation duration and therefore is allowed to revert to its state 1 or "off" state, at the end of the time $TM_7$, thus producing a command signal S(M7) shown in FIG. 2. The signal $\overline{S(M7)}$ which is the complement of S(M7), is applied to the input of a first OR-gate marked 8 in FIG. 1, whilst the second input of said same gate is supplied with the output signal S(C4) furnished by the comparator 4. The output signal S(p8) furnished by the gate 8 is shown in FIG. 2.

In order to enable the demodulator circuits to return to their normal operating conditions a third monostable trigger stage 9 can be provided, this stage having a relaxation time $T_{m9}$ whose duration is designed to enable resetting of the demodulating circuits to take place by lengthening the duration of the control or in other words command signal S(p8) by a fixed quantity. The signals furnished by said trigger stage 9 are combined by means of a gate 10 with the signals furnished by the monostable trigger stage 7 in the manner described hereinafter in order to produce a defect signal.

The output signal S(p8) (see FIG. 2) furnished by the gate 8 is applied to the input of the monostable trigger stage 9.

The output signal $S(M_9)$ (see FIG. 2) from the trigger stage 9 is then applied to one of the inputs of a second gate 10 whose second input is supplied with the complementary signal $\overline{S}(M_7)$ furnished by the monostable trigger stage 7. The signal S(10) picked-off at the output of said gate 10 (the diagram of which has been shown in FIG. 2) constitutes an error signal S(10) applied to the first input of a defect correcting circuit 11 whose second input is connected to the output of the demodulator 2. The defect signal S(10) is capable of activating the defect correcting circuit 11 so that said circuit provides the offsetting of the defects in the read-out signal S(F) as soon as they appear at the demodulator and as soon as they are detected, in accordance with the invention and as described earlier, thus furnishing a correct input signal S(s).

In the example described, the triggering of the defect signal responsible for producing the correction, takes place with each rise flank in the signal S(10) but this is purely an example. By arranging for a different combination between the triggering of the monostable trigger stages, it would equally be possible to produce a defect signal with each decay flank of said signal.

As FIG. 2 shows, a correction takes place when a defect of the kind which is encountered during the interval b and a defect of the kind encountered during the interval c, occurs.

Figure 3:
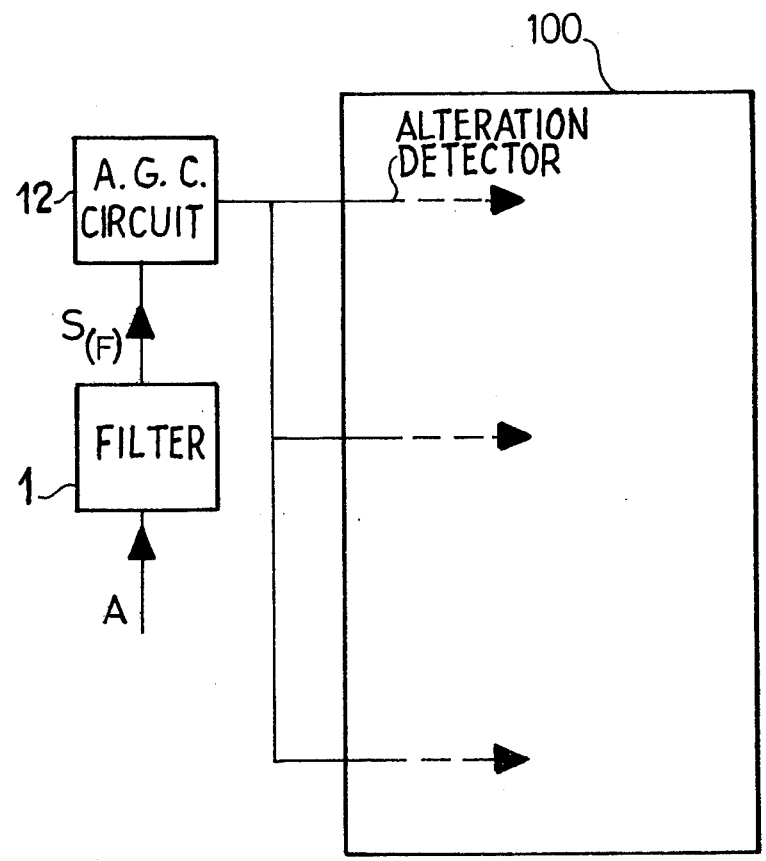
FIG. 3 is a variant embodiment of the system of FIG. 1.

To prevent detection of a signal disturbance of a kind other than a defect within the signal itself, which defect is the only one with which the detection and corrective control in accordance with the invention are concerned, an automatic gain control device 12 can, as FIG. 3 shows, be arranged between the output of the filter 1 and the input of an apparatus in accordance with the invention, the latter apparatus having been illustrated highly schematically in FIG. 3 by a block marked 100. In fact, this block comprises the various elements defined hereinbefore and more explicity illustrated in FIG. 1.

A device in accordance with the invention can be used more especially to improve the read-out qualities of the signals furnished by the read-out pick-up of a reproduction system such as a disc carrying the recording of a video signal, or a magnetic tape.

What we claim is:

1. A method of detecting defects undergone by a read-out signal supplied from a reproducing system through the medium of a filter; said read-out signal being constituted by an angularly modulated carrier wave having a predetermined mean value of peak amplitude, and a frequency range extending above a predetermined lower frequency limit; said defects comprising drop-out and transients produced by said filter; said method comprising the steps of feeding said read-out signal to the respective first inputs of first and second comparator circuits; respectively biasing the second inputs of said first and second comparator circuits with a first and a second threshold voltage; adjusting said first threshold voltage below said mean value of peak amplitude; adjusting said second threshold voltage slightly above said mean value of peak amplitude; triggering a first monostable circuit with the first of said comparator circuits, said first monostable circuit having a relaxation duration higher than the reciprocal of said lower frequency limit; feeding the trigger input of a second monostable circuit with the output of a first OR gate having two inputs respectively supplied with signals from the complement output of said first monostable circuit and from the output of said second comparator circuit; and feeding a second OR gate with the signal supplied from said second monostable circuit and the signal supplied at said complement output for delivering a defect control signal.

2. A method as claimed in claim 1, further comprising the step of controlling a defect correction circuit with said defect control signal; defect correction circuit receiving on its main input said read-out signal, after demodulation.

3. A system for detecting defects undergone by a read-out signal supplied from a reproducing system through the medium of a filter; said read-out signal being constituted by an angularly modulated carrier wave having a predetermined mean value of peak amplitude, and a frequency range extending above a predetermined lower frequency limit; said defects comprising drop-out and transients produced by said filter; said system comprising: a first and second comparator circuit having first inputs receiving said read-out signal and second inputs respectively biased with first and second threshold voltages; a first monostable circuit being triggered by said first comparator circuit; a first OR gate receiving the signal supplied at the complement output of said first monostable circuit, and the signal supplied at the output of said second comparator circuit; a second monostable circuit being triggered by the signal supplied from said first OR gate; a second OR gate having one input connected to the output of said second monostable circuit; and a further input connected to said complement output; said first threshold voltage being lower than the mean value of the peak amplitude of said read-out signal; said second threshold voltage lying slightly above said mean value of peak amplitude.

4. A system as claimed in claim 3, further comprising automatic gain control means; said automatic gain control means being inserted between the filter supplying said read-out signal and the first inputs of said first and second comparator circuits.

5. A system as claimed in claim 3, further comprising an optical read-out head associated with playing back means for reading out an optically readable data carrier; said optical read-out head feeding to the input of said filter at least one angularly modulated carrier wave stored on said data carrier.

* * * * *